(12) United States Patent
Mallary (10) Patent No.: US 6,966,225 B1
(45) Date of Patent: Nov. 22, 2005

(54) CAPACITIVE ACCELEROMETER WITH LIQUID DIELECTRIC

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 207 days.

(21) Appl. No.: 10/194,583

(22) Filed: Jul. 12, 2002

(51) Int. Cl.[7] .......................... G01P 15/125; H01G 5/00
(52) U.S. Cl. ............... 73/514.32; 73/514.18; 361/289
(58) Field of Search .................. 73/514.32, 514.18, 73/514.05, 514.12, 514.01, 514.06, 289; 361/280, 283.1, 289

(56) References Cited

U.S. PATENT DOCUMENTS

| | | | |
|---|---|---|---|
| 5,205,171 A * | 4/1993 | O'Brien et al. ............ | 73/14.18 |
| 5,726,073 A | 3/1998 | Zhang et al. ................. | 438/20 |
| 6,000,280 A * | 12/1999 | Miller et al. ................. | 73/105 |
| 6,000,287 A * | 12/1999 | Menzel ........................... | 19/57 |
| 6,073,484 A * | 6/2000 | Miller et al. ................. | 73/105 |
| 6,133,670 A * | 10/2000 | Rodgers et al. ............ | 310/309 |
| 6,359,757 B1 * | 3/2002 | Mallary ................... | 360/294.3 |
| 6,512,666 B1 * | 1/2003 | Duva ....................... | 361/321.2 |
| 6,566,978 B2 * | 5/2003 | Stevenson et al. .......... | 333/182 |

OTHER PUBLICATIONS

Abstracts, 46th Annual Conference on Magnetism & Magnetism Materials, Seattle, Washington, Nov. 12-16, 2001.

\* cited by examiner

*Primary Examiner*—Hezron Williams
*Assistant Examiner*—Jacques M. Saint-Surin
(74) *Attorney, Agent, or Firm*—David M. Sigmond (57) ABSTRACT

An accelerometer includes a capacitive sensing device and circuitry. The capacitive sensing device has electrode structures spaced by a gap for relative movement in response to a force applied to the capacitive sensing device to produce a displacement of the electrode structures. A liquid is disposed in the gap between the electrode structures. The circuitry is coupled to the capacitive sensing device for determining from the displacement an electric signal indicative of acceleration of the applied force.

125 Claims, 5 Drawing Sheets

CAPACITIVE ACCELEROMETER WITH LIQUID DIELECTRIC

BACKGROUND

The invention relates generally to accelerometers and, in particular, to capacitance-type accelerometers.

In the study of physical systems, it is often desirable to observe the motion of a system and, in particular, its acceleration. Accelerometers can be described as a combination of two transducers—a primary transducer, which converts acceleration of a mass into displacement, and a secondary transducer, which converts the displacement of the mass into an electric signal.

Capacitance accelerometers employ a capacitor between the mass and a support structure, and measure the variable capacitance between the two. More specifically, an acceleration of the mass causes a change in the space between moving and fixed plates of the capacitor. The change in the space or displacement of the moving plate relative to the fixed plate is inversely proportional to the charge on the capacitor.

Accelerometers are now being manufactured in Micro-Electro-Mechanical Systems (MEMS), which integrate mechanical elements, sensors and electronics on a common silicon substrate through the utilization of microfabrication technology. While the electronics are fabricated using integrated circuit processing sequences, the micro-mechanical components are fabricated using compatible "micro-machining" processes that selectively etch away parts of the silicon wafer or add new structural layers to form the mechanical and electromechanical devices. As the availability of accelerometer MEMS drives the use of accelerometers in small size, lightweight and lower cost sensing systems in all application domains, however, there is an ever increasing need for higher sensitivity and precision accelerometers.

SUMMARY

In one general aspect, an accelerometer includes a capacitive sensing device having electrode structures spaced by a gap for relative movement in response to a force applied to the capacitive sensing device to produce a displacement of the electrode structures. A liquid is disposed in the gap between the electrode structures. The accelerometer further includes circuitry coupled to the capacitive sensing device for determining from the displacement an electric signal indicative of acceleration of the applied force.

Embodiments of the invention may include one or more of the following features.

The circuitry is configured for passive damping. In particular, the circuitry is configured to provide an AC voltage across the capacitive sensing device and measure a resulting AC current.

Alternatively, the circuitry is configured for active damping. In particular, the circuitry is configured to provide an AC voltage across the capacitive sensing device and produce therefrom a DC voltage proportional to the acceleration. The circuitry is further configured to invert the DC voltage and apply the inverted DC voltage across the capacitive sensing device to return the electrode structures to an initial relative position.

The liquid has a dielectric constant selected to produce a predetermined increase in an electrostatic force produced between the electrode structures in response to the applied DC voltage. For example, such force amplification is produced if the dielectric constant exceeds one.

The viscosity of the liquid provides a selected amount of damping of the relative movement of the electrode structures.

Particular implementations of the invention may provide one or more of the following advantages. The liquid provides numerous advantages. The dielectric constant of a liquid can be selected to be greater than air, thus leading to an increase in sense current for a given applied AC voltage and therefore increased accelerometer sensitivity. The viscosity of the liquid provides for a predetermined amount of damping of the relative movement of the electrode structures. In an accelerometer with active damping, the force amplification of the liquid reduces the amount of bias voltage needed to return the electrode structures to an initial position. In addition, the liquid avoids contact between the elements that might otherwise occur during use. This helps prevent arcing between the elements and accompanying wear, as well as catastrophic failure such as the electrode structures breaking as they collide.

Other features and advantages of the invention will be apparent from the following detailed description, and from the claims.

DETAILED DESCRIPTION

Figure 1:
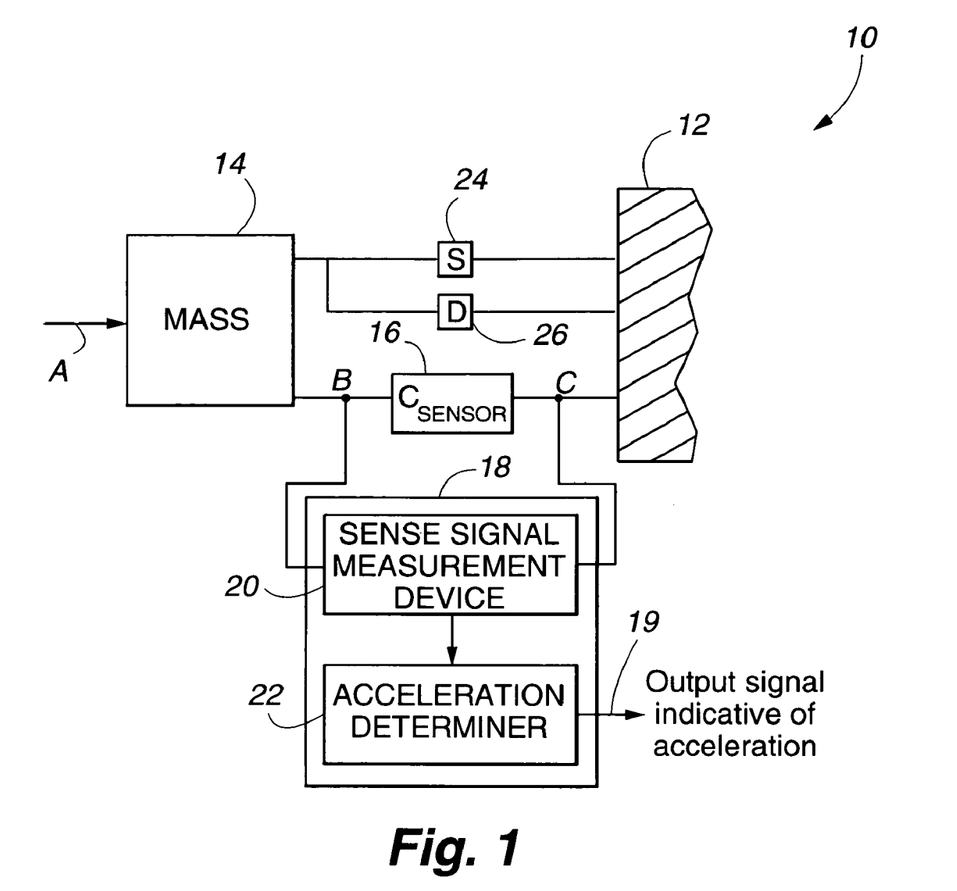
FIG. 1 shows an accelerometer having a capacitive sensing device.

FIG. 1 is a general schematic view of an accelerometer 10. The accelerometer 10 includes a substrate or support frame 12, a movable mass 14 and an acceleration sensing device 16 coupled to the support frame 12 and the mass 14 for sensing acceleration ("a") applied to the mass 14 in a direction perpendicular to the support frame 12 (shown as direction of arrow A). The acceleration sensing device 16 is a capacitive sensing device shown as $C_{sensor}$. The accelerometer 10 also includes acceleration measurement circuitry 18 coupled to the acceleration sensing device 16 (at points "B" and "C") for converting information provided by the acceleration sensing device 16 to an electrical signal 19 indicative of the acceleration. The circuitry 18 includes a first device 20 to measure a sense signal value (either an AC current or DC voltage, as will be described) and a second device 22 that derives the electrical signal indicative of acceleration from the value produced by the first device 20. Preferably, the capacitive sensing device (or, simply, capacitor) 16 alone or in conjunction with the acceleration measurement circuitry 18, or, alternatively, the entire system 10, is implemented as a micro-electro-mechanical system (MEMS).

In a capacitive accelerometer such as the one shown in FIG. 1, the separation of the plates of the capacitive sensing device 16 is used to measure the displacement of the mass when a force is applied the mass. From the displacement the acceleration of the mass is derived. More specifically, the charge Q (on the capacitive sensing device 16) is expressed by $$Q = V*C = V*(A*\epsilon/X) \quad \text{(Eq. 1)}$$

where "A" is the area of $C_{sensor}$ 16, "X" is separation of the plates of $C_{sensor}$ 16 (or displacement of one plate relative to the other in response to the movement of the mass 14), "$\epsilon$" is the dielectric constant and "V" is the voltage between the plates. Thus, the amount of charge Q (which is proportional to 1/X) is a measure of the displacement X.

The accelerometer 10 further includes a spring 24 and a damper 26 coupled to the mass 14 and the support frame 12, as shown. The spring 24 and damper 26 are used to dampen frequency (smooth out ringing) above the resonant frequency of the system 10, preferably in a minimum amount of time, so that the displacement measurement is accurate.

Figure 2:
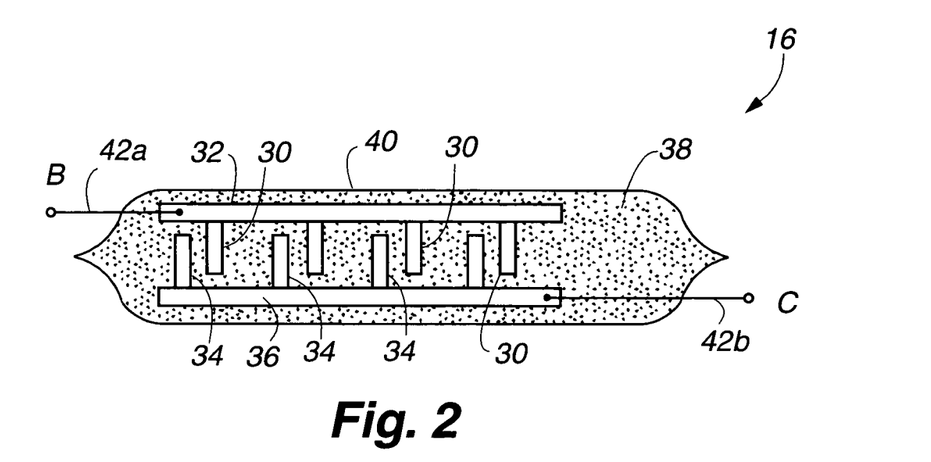
FIG. 2 shows a detailed diagram of the capacitive sensing device (of FIG. 1), which has a liquid dielectric.
Figure 3:
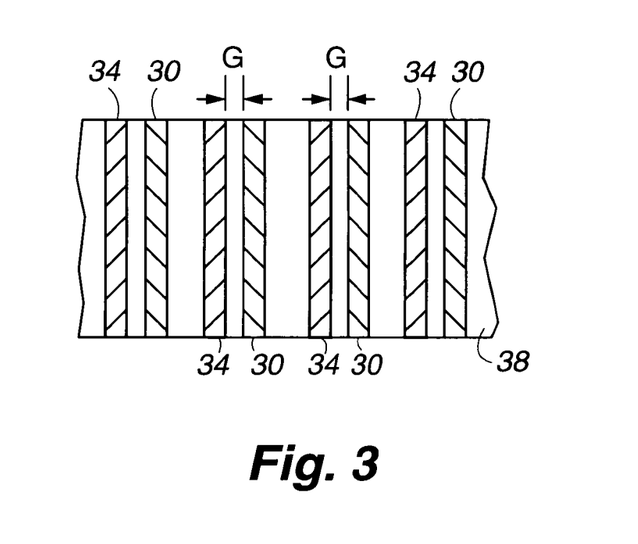
FIG. 3 is a cross-sectional view of the elements of the capacitive sensing device of FIG. 2.

Referring to FIGS. 2 and 3, one embodiment of the capacitive sensing device $C_{sensor}$ 16 is shown. The capacitive sensing device 16 includes a first electrode structure having a set of elements 30 mounted on a movable upper member 32 and spaced by a gap G from a second electrode structure having a corresponding set of elements 34 mounted on a stationary lower member 36. That is, each element 30 is paired with an element 34 and is spaced therefrom by gap G. Elements 30, 34 extend across the width of respective members 32, 36 (FIG. 2). Thus, the elements 30 move with the mass 14 relative to the other set of elements 34 which are fixed. A liquid 38 fills the gap G between elements 30, 34 and the spacing between members 32, 36, and serves as the dielectric material for the capacitive sensing device 16. Liquid 38 is encased within the device 16 by an envelope 40 (such as a thin, flexible mylar film).

Further details of the device 16 can be as described in U.S. Pat. No. 6,359,757, entitled "Electrostatic Actuator," incorporated herein by reference. For instance, the device 16 can be used in a disk drive that includes an arm, a transducer and a storage medium, where the arm moves the transducer across the storage medium, the transducer exchanges data signals with the storage medium, and the device 16 is mounted between the arm and the transducer.

The members 32, 36 (and hence elements 30, 34) are connected to the acceleration measurement circuitry 18, as well as the mass 14 and support frame 12, by a set of leads 42a, 42b which protrude through the envelope 40. In the embodiment shown, the spacing between the elements 30, 34 is asymmetrical. That is, in an at-rest position, as is shown, each element 30 is spaced closer to one of the adjacent elements 34 than it is to the other. This spacing asymmetry is necessary for a strong dependence of capacitance on the displacement of mass 14.

The liquid 38 can be selected to have a dielectric constant that is higher than that of air (which is one). The higher the dielectric constant, the greater the sense current, as will be discussed in further detail below. In addition to having a high dielectric constant, the viscous flow of liquid 38 between elements 30, 34 provides damping to reduce oscillation and mute resonances between elements 30, 34. Hence, the use of the liquid 38 instead of a more conventional choice of air as a dielectic provides for greater precision and sensitivity as well as passive damping.

Figure 4:
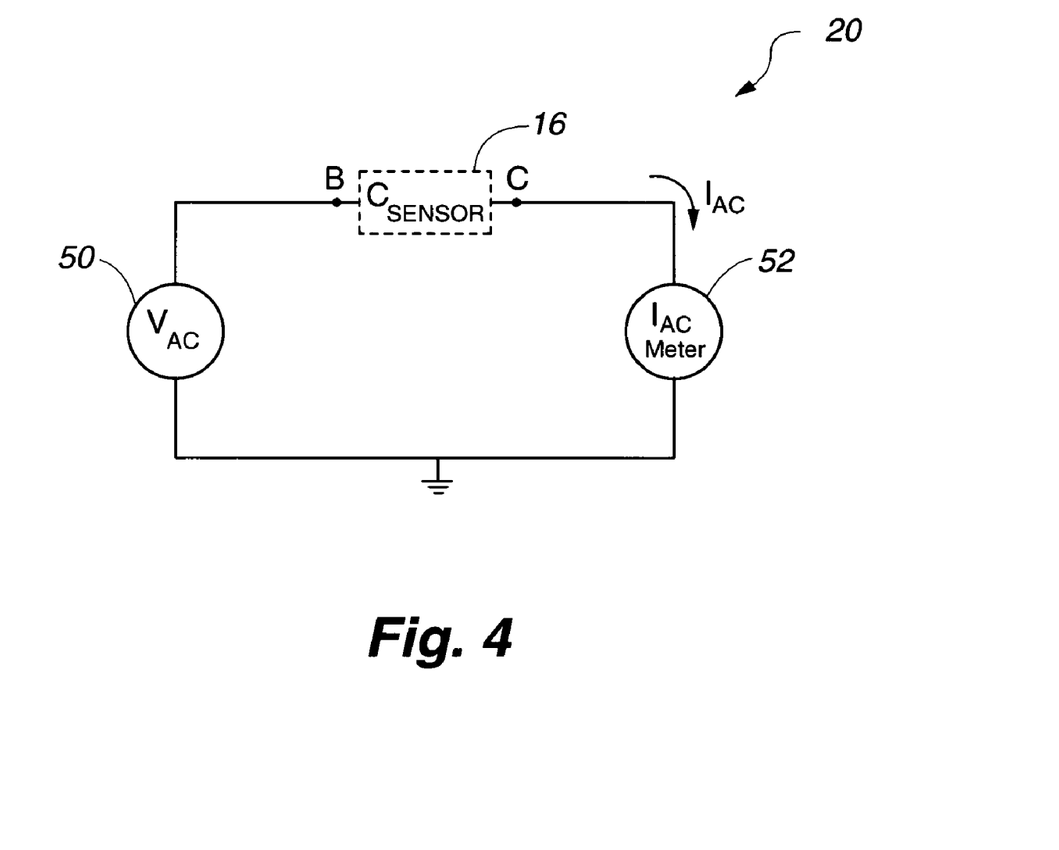
FIG. 4 shows one embodiment of the accelerometer (of FIGS. 1–3) that includes circuitry to support passive damping.

Referring to FIG. 4, an embodiment of the device 20 that supports only passive damping is shown. The device 20 includes an AC voltage source 50 coupled to one side (corresponding to point "B" in FIGS. 1–2) of the capacitive sensing device 16, shown here in dashed lines, and to ground. The device 20 further includes an AC current meter 52 that is connected to the other side (corresponding to point "C" in FIGS. 1–2) of the capacitive sensing device 16 and ground.

For a high frequency AC voltage provided by the voltage source 50, it is possible to measure the AC current $I_{AC}$. Since $$I_{AC} = V_{AC}*C*2\Pi f = V_{AC}(A*\epsilon/X)*2\Pi f \quad \text{Eq. 2}$$

the value of X can be determined from $I_{AC}$. As X=F/K=M*a/K where M is the mass, K is the spring constant and "a" is acceleration, the acceleration can be determined from the displacement X. Alternatively, instead of measuring $I_{AC}$, it will be understood that the charge Q on the sensor capacitor $C_{sensor}$ 16 can be measured instead. The higher the dielectric constant, the higher the current $I_{AC}$ for a given applied voltage $V_{AC}$.

Thus, using a liquid dielectric having a higher dielectric constant means that the accelerometer can sense better. The liquid 38 also provides mechanical damping due to the viscosity of the liquid, as mentioned earlier.

Figure 5:
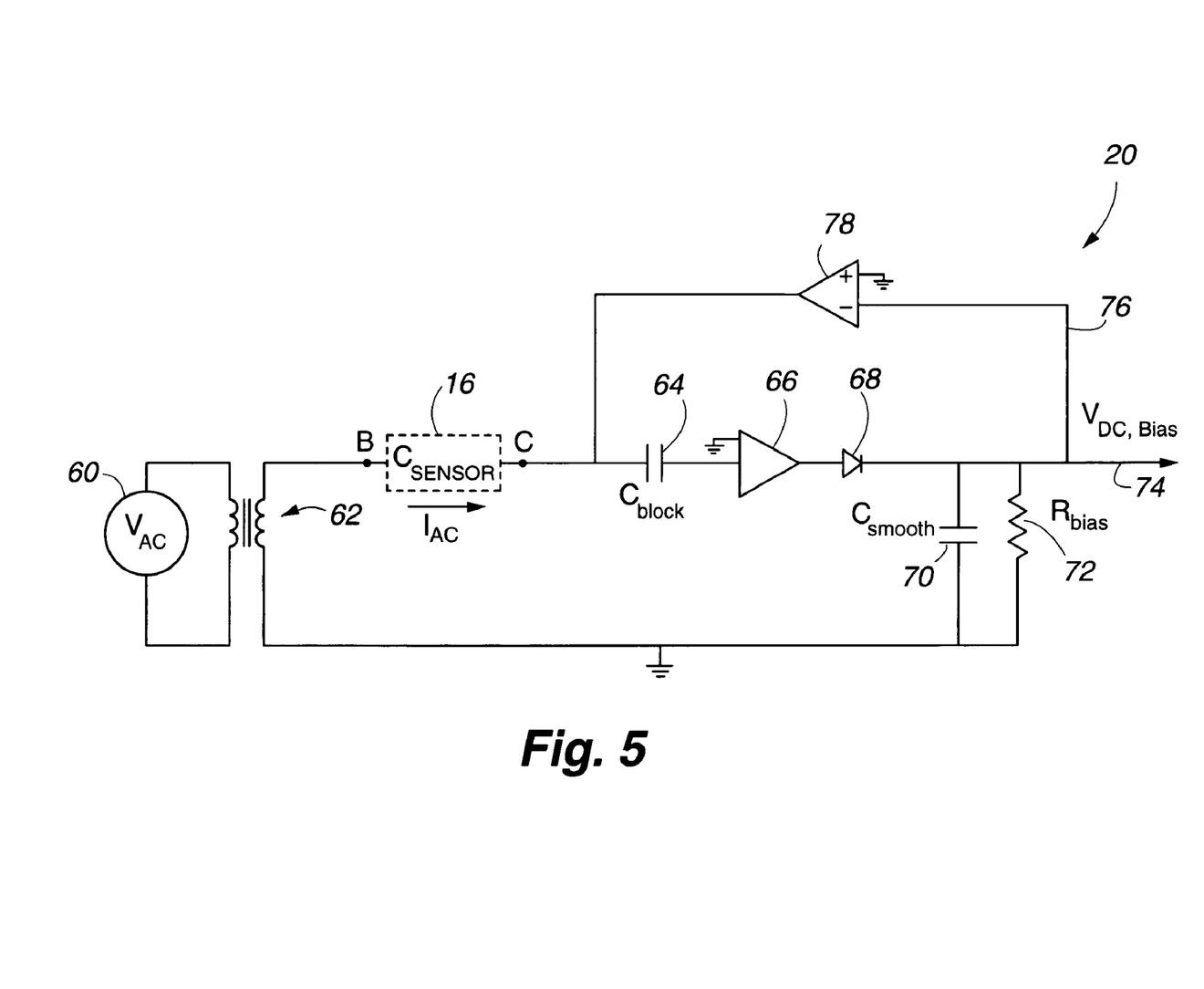
FIG. 5 shows an alternative embodiment of the accelerometer that includes circuitry to support active damping.

High precision accelerometers may be closed-loop to satisfy dynamic range, linearity and bandwidth requirements, thus active damping may be used as well. FIG. 5 shows an exemplary alternative embodiment of the device 20 that employs active damping. That is, in addition to the passive damping provided by the liquid 38, an electronic signal is produced to return elements 30 of the capacitive sensing device 16 to their initial at-rest position. In the example shown, the device 20 includes an AC power source 60 for supplying an AC voltage $V_{AC}$. The $V_{AC}$ source 60 is coupled to the "B" side of the $C_{sensor}$ 16 through a transformer 62. The "C" side of the $C_{sensor}$ 16 is connected to a blocking capacitor $C_{block}$ 64, which is also connected to an amplifier 66. The output of the amplifier 66 is provided to a diode 68. The diode 68 produces a DC signal from the incoming AC signal. That is, it performs as a rectifier. Connected in parallel across the output of the diode 68 and ground are a smoothing capacitor $C_{smooth}$ 70 and a bias resistor $R_{bias}$ 72. The components 72 and 70 form an RC filter to filter out the AC components of the rectified signal produced by the diode 68. More specifically, the smoothing capacitor $C_{smooth}$ 70 shunts the AC sense current to ground and the resistor $R_{bias}$ 72 provides a discharge path for the capacitance of $C_{smooth}$ 70. An output $V_{DC}$ 74 is measured across the $R_{bias}$ 72. The $V_{DC}$ 74 is provided in a feedback loop, which contains an inverter 78 to change the sign of $V_{DC}$ so that $V_{DC}$ is provided as a negative bias voltage to the $C_{sensor}$ 16. The blocking capacitor $C_{block}$ 64 blocks $V_{DC}$, bias but passes the AC sense current $I_{AC}$ to the amplifier 66. The transformer 62 provides a DC path to ground.

Thus, for active damping, the circuitry 18 applies an AC voltage $V_{AC}$ from the AC voltage source 60 to the capacitive sensing device 16, and measures at the output of the circuitry the DC voltage $V_{DC}$, which is then fed back to the $C_{sensor}$ 16 as a displacement bias voltage. The voltage $V_{DC}$ is proportional to X, and therefore proportional to acceleration. The value of $V_{DC}$ decreases when the distance X between the elements 30, 34 decreases and increases when the distance X between the elements 30, 34 increases. The active damping therefore allows constant spacing between the elements 30, 34 to be maintained by attempting to keep $I_{AC}$ constant. The active damping allows for good frequency response and thus accommodates very high frequencies.

Figure 6:
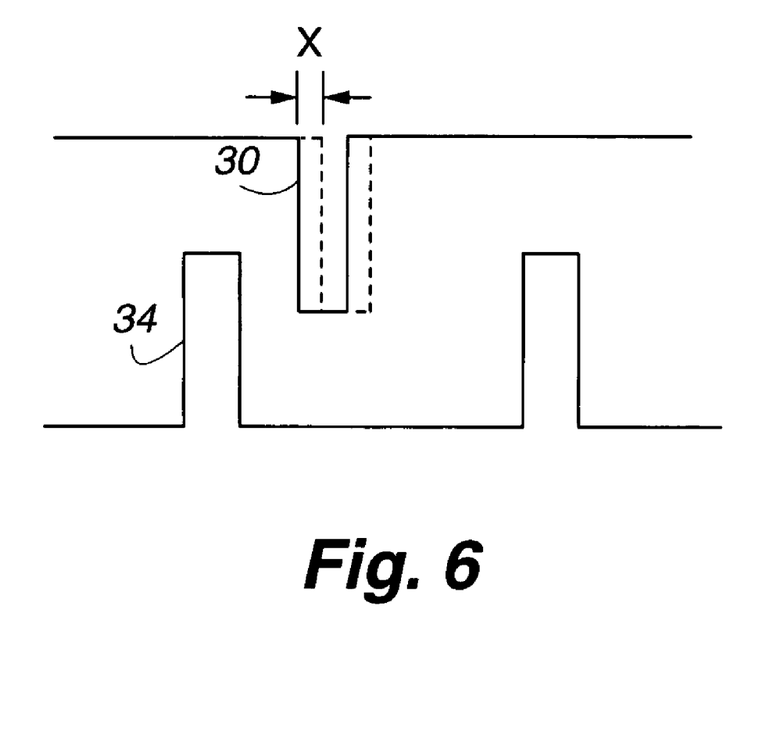
FIG. 6 shows relative positioning of movable elements relative to fixed elements in response to an acceleration.

Referring to FIGS. 5–6, the application of the DC biasing voltage across the $C_{sensor}$ 16 causes each movable element 30 to return from a position of displacement X relative to the fixed elements 34 (shown in dashed lines) to its initial position (shown in solid lines). For a given level of DC voltage, the electrostatic attractive force produced between pairs of elements 30, 34 is proportional to the dielectric constant of the liquid 38. The liquid 38 amplifies the electrostatic attractive force if its dielectric constant is greater than one (i.e., the dielectric constant of air, which is used in conventional electrostatic accelerometers to occupy the gap between the pairs of elements). The amplification provided by liquid 38 thus increases the amount by which each member 30 is moved for a given $V_{DC}$.

The reason for the force amplification can be seen by considering elements 30, 34 to be the plates of a capacitor having liquid 38 as its dielectric. The force between the plates of an immersed capacitor of capacitance C is derived as follows. When a charge Q is placed on the plates, the voltage across the plates is:

$$V=Q/C \qquad \text{(Eq. 3)}$$

and the energy E stored in the capacitor is:

$$E=CV^2/2 \qquad \text{(Eq. 4)}$$

Because capacitance C is inversely proportional to the spacing between the plates, if the plates are pulled apart so that the spacing (e.g., gap G of FIGS. 2–3) is doubled, the capacitance is reduced by half. Accordingly, the voltage V across the plates and the stored energy E are doubled (see equation 4). Conservation of energy dictates that the source of the stored energy increase must be the attractive electrostatic force acting over the gap between the plates. Because capacitance C is proportional to the dielectric constant of liquid 38, and the increase in stored energy is proportional to C (for a given voltage V), it follows that the electrostatic attractive force between the plates is also proportional to the dielectric constant of liquid 38.

Consequently, in addition to providing the same passive damping advantages as discussed above with respect to FIG. 4, the liquid dielectric 38 enhances active damping because a lower $V_{DC}$ is needed to resist a given acceleration. That is, the liquid dielectric 38 provides for a higher measurable acceleration for a given $V_{DC}$.

Referring again to FIG. 5, for optimal active damping, the circuitry component values should be selected according to the following criteria:

$Z(C_{block})=\frac{1}{2}\Pi f C_{block}$<<the resistance of the amplifier 66

$Z(C_{smooth})=\frac{1}{2}\Pi f C_{smooth}<<R_{bias}$ $C_{block}>>C_{sensor}$ $R_{bias}<<1/F_{resp}*2\Pi 2C_{smooth}$ (where $F_{resp}$ is accelerometer frequency response). In general, the device 20 of FIG. 5 should be implemented to ensure that active damping is as effective as passive damping.

It will be appreciated by those skilled in the art that there are many different ways to implement active damping. The circuitry shown in FIG. 5 is merely but one example.

Exemplary liquids 38 are discussed below, but first the properties of liquid 38 that may be important in some applications are explained. The selection of the composition of liquid 38 will often involve balancing all of these properties (including dielectric constant).

In addition to having a high dielectric constant, the preferred liquid 38 will have high resistivity, low vapor pressure and low melting point. Also, liquid 38 should be chemically stable and have a high breakdown voltage to avoid becoming dissociated in response to the electric field induced between elements 30, 34. These latter two properties are related to the resistivity of liquid 38. All of these properties should be relatively temperature insensitive so that liquid 38 performs consistency over the normal operating temperature of accelerometer 10. In addition, liquid 38 must be chemically compatible with the materials of members 32, 36, elements 30, 34, and envelope 40.

The resistivity of liquid 38 should be sufficiently high so that liquid 38 is substantially nonelectrically conductive. This avoids corrosive electrolytic interaction between elements 30, 34. For example, liquid 38 should have a resistivity on the order of $10^{12}$ ohm-cm. or higher. Liquid 38 should also be sufficiently chemically stable and have a breakdown voltage sufficiently high such that liquid 38 does not substantially dissociate in the presence of electrical fields. Such dissociation might reduce the resistivity (i.e., increase the conductivity) of liquid 38, which could lead to corrosive current flow between elements 30, 34. In addition, high resistivity avoids power dissipation associated with the flow of electrical current.

As mentioned earlier, the viscosity of liquid 38 provides advantages over air-dielectric accelerometers. As elements 30, 34 are pulled together in response to the applied DC bias voltage, the viscous flow of liquid 38 between elements 30, 34 provides damping to reduce oscillation and mute resonances between elements 30, 34. Accordingly, liquid 38 increases the linearity between the applied voltage and the amount of displacement between elements 30, 34. To optimize damping, the viscosity should be tuned to the geometry of accelerometer 10 (i.e., the arrangement of elements 30, 34) and the resonant frequency of accelerometer. But in any event, the viscosity should be relatively low, preferably less than 1 poise, and more preferably less than 0.01 poise.

Even with such a low viscosity, liquid 38 also helps prevent elements 30, 34 from contacting each other during use, which could cause arcing and wear and, in extreme cases, destroy elements 30, 34. The viscosity of liquid 38 induces pressure in gap G that resists flow of liquid 38 from between elements 30, 34. As elements 30, 34 approach contact, the flow-resistant pressure increases as the inverse third power of the spacing between elements 30, 34. As a result, the flow-resistant pressure rapidly approaches infinity as separation between elements 30, 34 approaches zero. In addition, as the separation becomes less than about five molecular layers of liquid 38, the flow-resistant pressure increases by approximately one order of magnitude as each subsequent molecular layer is removed. Accordingly, liquid 38 maintains a separation between elements 30, 34 of at least several molecular layers of liquid 38, even when accelerometer 10 is operated under high mechanical shock and vibration conditions.

Another property that liquid 38 should possess is a sufficiently low vapor pressure (which corresponds to a high boiling point), to avoid liquid 38 evaporating away during manufacture of accelerometer 10 or during use over its operating lifetime. How low the vapor pressure of liquid 38 should be is a function of the construction of accelerometer 10. For example, in the embodiment shown in FIG. 2, in which liquid 38 is encased in envelope 40, the vapor pressure can be higher than if envelope 40 were omitted, because envelope 40 serves as a barrier to evaporation. Thus, in the embodiment of FIG. 2, the vapor pressure of liquid 38 can be relatively high (e.g., on the order of 1 mm Hg), as long as the vapor pressure is not so high as to allow liquid 38 to evaporate rapidly during the manufacture of accelerometer 10. In embodiments in which envelope 40 is omitted, the vapor pressure of liquid 38 should be much lower, for example, on the order of $10^{-7}$ mm Hg or less.

The melting point of liquid 38 should also be relatively low (e.g., less than 0 degrees F.). A low melting point avoids liquid 38 freezing during use over the normal operating temperature range of accelerometer 10.

As discussed, for a given application, the composition of liquid 38 will often involve balancing all of the properties discussed herein. One liquid 38 believed to be suitable is diffusion pump oil, such as Univac #705 available from United Vacuum (Univac). Although the dielectric constant of diffusion pump oil (approximately 4) is not as high as other possible candidates for liquid 38, diffusion pump oil meets the other criteria set forth above. In particular, diffusion pump oil has a low vapor pressure (typically less than $10^{-7}$ mm Hg; Univac #705 has a vapor pressure of $10^{-10}$ mm Hg). Other highly chemically stable candidates for liquid 38 include transformer oil, perfluorcarbons (which typically have a dielectric constant of approximately 2), and hydrofluorocarbons such as freon (which have a somewhat higher dielectric constant than perfluorocarbons).

Halides (i.e., a compound of a halogen (fluorine, chlorine, bromine, iodine, and astatine) and a hydrocarbon or other more electropositive element or radical) typically have a sufficiently high dielectric constant to serve as liquid 38, because they induce strong dipole moments. Additionally, halides in general are highly chemically stable. Examples of potentially suitable halides include chlorobenzene (dielectric constant of 5.7, boiling point of 132 degrees C.), cis 1,2 dichloroethylene (dielectric constant of 9.2, boiling point of 60 degrees C.), orthodichlorobenzen (dielectric constant of 9.9, boiling point of 180 degrees C.), and nitrobenzene (dielectric constant of 34.8, boiling point of 211 degrees C.). The member/element structure of element 30, 34 may be fabricated in any suitable way, such as according to the methods described in U.S. Pat. No. 5,726,073, entitled "Compound Stage MEM Actuator Suspended for Multidimensional Motion," which is incorporated herein by reference.

Other embodiments are within the scope of the following claims.

For example, the materials discussed above for liquid 38 are not intended to be exhaustive; other materials with properties that meet one or more of the criteria discussed above may be used.

What is claimed is:

1. An accelerometer comprising:
 a capacitive sensing device that includes a movable electrode structure, a stationary electrode structure and a liquid, wherein the movable electrode structure includes a plurality of movable plates, the stationary electrode structure includes a plurality of stationary plates, the movable and stationary plates are asymmetrically interleaved with each other, gaps are disposed between corresponding ones of the movable and stationary plates, the liquid is disposed in the gaps and contacts the movable and stationary plates, the movable electrode structure moves towards the stationary electrode structure in response to a force applied to the capacitive sensing device, the stationary electrode structure remains stationary in response to the applied force, and the gaps decrease in response to the applied force, thereby creating a displacement between the movable and stationary electrode structures in response to the applied force; and circuitry coupled to the capacitive sensing device for determining from the displacement an electric signal indicative of acceleration of the applied force.

2. The accelerometer of claim 1, wherein the circuitry is configured for passive damping.

3. The accelerometer of claim 2, wherein the circuitry is configured to provide an AC voltage across the capacitive sensing device and measure a resulting AC current.

4. The accelerometer of claim 1, wherein the circuitry is configured for active damping.

5. The accelerometer of claim 4, wherein the circuitry is configured to provide an AC voltage across the capacitive sensing device and produce therefrom a DC voltage proportional to the acceleration.

6. The accelerometer of claim 5, wherein the circuitry is configured to derive a damping signal from the DC voltage.

7. The accelerometer of claim 5, wherein the circuitry is configured to invert the DC voltage and apply the inverted DC voltage across the capacitive sensing device to return the electrode structures to an initial relative position.

8. The accelerometer of claim 7, wherein the liquid has a dielectric constant selected to produce a predetermined increase in an electrostatic force produced between the electrode structures in response to the applied DC voltage.

9. The accelerometer of claim 8, wherein the liquid has a dielectric constant greater than one.

10. The accelerometer of claim 1, wherein the liquid is substantially nonelectrically conductive.

11. The accelerometer of claim 1, wherein the liquid has a resistivity of on the order of $10^{12}$ ohm-cm. or higher.

12. The accelerometer of claim 8, wherein the liquid is chemically stable so as not to substantially dissociate in the presence of an electric field produced between the electrode structures by the applied DC voltage.

13. The accelerometer of claim 8, wherein the liquid has a breakdown voltage sufficient so as not to substantially dissociate in response to the applied DC voltage.

14. The accelerometer of claim 1, wherein the liquid has a viscosity that provides a selected amount of damping of the relative movement of the electrode structures.

15. The accelerometer of claim 1, wherein the liquid has a viscosity of less than 1 poise.

16. The accelerometer of claim 1, wherein the liquid has a viscosity of less than 0.01 poise.

17. The accelerometer of claim 1, wherein the liquid has a vapor pressure on the order of $10^{-7}$ mm Hg or lower.

18. The accelerometer of claim 1, wherein the liquid has a melting point of less than 0 degrees F.

19. The accelerometer of claim 1, wherein the liquid is diffusion pump oil.

20. The accelerometer of claim 1, wherein the liquid is a perfluorocarbon or a hydrofluorocarbon.

21. The accelerometer of claim 1, wherein the liquid is a halide.

22. The accelerometer of claim 1, further comprising an envelope in which the electrode structures and the liquid are disposed.

23. The accelerometer of claim 22, wherein the envelope is a flexible mylar film.

24. The accelerometer of claim 23, wherein the liquid is encased within the envelope.

25. The accelerometer of claim 23, wherein first and second leads coupled to the movable and stationary electrode structures, respectively, protrude through the envelope.

26. An accelerometer comprising:
 a capacitive sensing device that includes first and second electrode structures and a liquid, wherein the first electrode structure includes a plurality of first plates, the second electrode structure includes a plurality of second plates, the first and second plates are asymmetrically interleaved with each other, gaps are disposed between corresponding ones of the first and second plates, the liquid is disposed in the gaps and contacts the first and second plates, the electrode structures move towards each other in response to a force applied to the capacitive sensing device, and the gaps decrease in response to the applied force, thereby creating a displacement between the electrode structures in response to the applied force; and circuitry coupled to the capacitive sensing device for determining from the displacement an electric signal indicative of acceleration of the applied force.

27. The accelerometer of claim 26, wherein the circuitry is configured for passive damping.

28. The accelerometer of claim 27, wherein the circuitry is configured to provide an AC voltage across the electrode structures and measure a resulting AC current.

29. The accelerometer of claim 26, wherein the circuitry is configured for active damping.

30. The accelerometer of claim 29, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

31. The accelerometer of claim 26, wherein the liquid is substantially nonelectrically conductive.

32. The accelerometer of claim 26, wherein the liquid provides damping of the relative movement of the electrode structures.

33. The accelerometer of claim 26, wherein the electrode structures have comb-like shapes.

34. The accelerometer of claim 26, wherein the first electrode structure is movable and the second electrode structure is stationary.

35. The accelerometer of claim 26, further comprising a flexible envelope in which the electrode structures and the liquid are disposed, wherein first and second leads coupled to the first and second electrode structures, respectively, protrude through the envelope, and the liquid contacts and is encased within the envelope.

36. An accelerometer comprising:
a capacitive sensing device that includes first and second electrode structures and a liquid, wherein the first electrode structure includes a plurality of first plates, the second electrode structure includes a plurality of second plates, the first and second plates are interleaved with each other and protrude along a first axis, gaps are disposed between corresponding ones of the first and second plates, the liquid is disposed in the gaps and contacts the first and second plates, the electrode structures move towards each other primarily along a second axis perpendicular to the first axis such that the first and second plates are more asymmetrically interleaved with each other in response to a force applied to the capacitive sensing device, and the gaps decrease in response to the applied force, thereby creating a displacement between the electrode structures in response to the applied force; and circuitry coupled to the capacitive sensing device for determining from the displacement an electric signal indicative of acceleration of the applied force.

37. The accelerometer of claim 36, wherein the circuitry is configured for passive damping.

38. The accelerometer of claim 37, wherein the circuitry is configured to provide an AC voltage across the electrode structures and measure a resulting AC current.

39. The accelerometer of claim 36, wherein the circuitry is configured for active damping.

40. The accelerometer of claim 39, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

41. The accelerometer of claim 36, wherein the liquid is substantially nonelectrically conductive.

42. The accelerometer of claim 36, wherein the liquid provides damping of the relative movement of the electrode structures.

43. The accelerometer of claim 36, wherein the electrode structures have comb-like shapes.

44. The accelerometer of claim 36, wherein the first electrode structure is movable and the second electrode structure is stationary.

45. The accelerometer of claim 36, further comprising a flexible envelope in which the electrode structures and the liquid are disposed, wherein first and second leads coupled to the first and second electrode structures, respectively, protrude through the envelope, and the liquid contacts and is encased within the envelope.

46. An accelerometer comprising:
a capacitive sensing device that includes first and second electrode structures and a liquid, wherein the first electrode structure includes a plurality of first plates, the second electrode structure includes a plurality of second plates, the first and second plates are interleaved with each other, protrude along a first axis and are arranged in corresponding pairs such that each plate in the pair is closer to the other plate in the pair than to any other plate, gaps are disposed between the plates in the pairs, the liquid is disposed in the gaps and contacts the first and second plates, the electrode structures move towards each other primarily along a second axis perpendicular to the first axis such that plates in the pairs move towards each other in response to a force applied to the capacitive sensing device, and the gaps decrease in response to the applied force, thereby creating a displacement between the electrode structures in response to the applied force; and circuitry coupled to the capacitive sensing device for determining from the displacement an electric signal indicative of acceleration of the applied force.

47. The accelerometer of claim 46, wherein the circuitry is configured for passive damping.

48. The accelerometer of claim 47, wherein the circuitry is configured to provide an AC voltage across the electrode structures and measure a resulting AC current.

49. The accelerometer of claim 46, wherein the circuitry is configured for active damping.

50. The accelerometer of claim 49, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

51. The accelerometer of claim 46, wherein the liquid is substantially nonelectrically conductive.

52. The accelerometer of claim 46, wherein the liquid provides damping of the relative movement of the electrode structures.

53. The accelerometer of claim 46, wherein the electrode structures have comb-like shapes.

54. The accelerometer of claim 46, wherein the first electrode structure is movable and the second electrode structure is stationary.

55. The accelerometer of claim 46, further comprising a flexible envelope in which the electrode structures and the liquid are disposed, wherein first and second leads coupled to the first and second electrode structures, respectively, protrude through the envelope, and the liquid contacts and is encased within the envelope.

56. An accelerometer comprising:
a capacitive sensing device that includes first and second electrode structures and a liquid, wherein the first electrode structure includes a plurality of first plates, the second electrode structure includes a plurality of second plates, the first and second plates are interleaved with each other, protrude along a first axis and are arranged in corresponding pairs such that each plate in the pair is closer to the other plate in the pair than to any other plate, gaps are disposed between the plates in the pairs, the liquid is disposed in the gaps and contacts the first and second plates, the electrode structures move towards each other primarily along a second axis perpendicular to the first axis such that each plate in the pair is even closer to the other plate in the pair than to any other plate in response to a force applied to the capacitive sensing device, and the gaps decrease in response to the applied force, thereby creating a displacement between the electrode structures in response to the applied force; and
circuitry coupled to the capacitive sensing device for determining from the displacement an electric signal indicative of acceleration of the applied force.

57. The accelerometer of claim 56, wherein the circuitry is configured for passive damping.

58. The accelerometer of claim 57, wherein the circuitry is configured to provide an AC voltage across the electrode structures and measure a resulting AC current.

59. The accelerometer of claim 56, wherein the circuitry is configured for active damping.

60. The accelerometer of claim 59, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

61. The accelerometer of claim 56, wherein the liquid is substantially nonelectrically conductive.

62. The accelerometer of claim 56, wherein the liquid provides damping of the relative movement of the electrode structures.

63. The accelerometer of claim 56, wherein the electrode structures have comb-like shapes.

64. The accelerometer of claim 56, wherein the first electrode structure is movable and the second electrode structure is stationary.

65. The accelerometer of claim 56, further comprising a flexible envelope in which the electrode structures and the liquid are disposed, wherein first and second leads coupled to the first and second electrode structures, respectively, protrude through the envelope, and the liquid contacts and is encased within the envelope.

66. An accelerometer comprising:
a capacitive sensing device that includes first and second electrode structures and a liquid, wherein a gap is disposed between the electrode structures, the liquid is disposed in the gap and contacts the electrode structures, the electrode structures move towards each other in response to a force applied to the capacitive sensing device, and the gap decreases to a thickness of at least several molecular layers of the liquid and less than about five molecular layers of the liquid in response to the applied force, thereby creating a displacement between the electrode structures in response to the applied force; and
circuitry coupled to the capacitive sensing device for determining from the displacement an electric signal indicative of acceleration of the applied force.

67. The accelerometer of claim 66, wherein the circuitry is configured for passive damping.

68. The accelerometer of claim 67, wherein the circuitry is configured to provide an AC voltage across the electrode structures and measure a resulting AC current.

69. The accelerometer of claim 66, wherein the circuitry is configured for active damping.

70. The accelerometer of claim 69, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

71. The accelerometer of claim 66, wherein the liquid is substantially nonelectrically conductive.

72. The accelerometer of claim 66, wherein the liquid provides damping of the relative movement of the electrode structures.

73. The accelerometer of claim 66, wherein the electrode structures have comb-like shapes with protruding plates that are asymmetrically interleaved with each other.

74. The accelerometer of claim 66, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

75. The accelerometer of claim 66, further comprising a flexible envelope in which the electrode structures and the liquid are disposed, wherein first and second leads coupled to the first and second electrode structures, respectively, protrude through the envelope, and the liquid contacts and is encased within the envelope.

76. An accelerometer comprising:
a capacitive sensing device that includes first and second electrode structures and a liquid, wherein a gap is disposed between the electrode structures, the liquid is disposed in the gap and contacts the electrode structures, the electrode structures move towards each other in response to a force applied to the capacitive sensing device, and the gap decreases in response to the applied force, thereby creating a displacement between the electrode structures in response to the applied force; and
circuitry coupled to the capacitive sensing device for determining from the displacement an electric signal indicative of acceleration of the applied force, wherein the circuitry is configured for active damping and does not apply a fixed DC bias to the electrode structures.

77. The accelerometer of claim 76, wherein the circuitry is configured to provide an AC voltage to the first electrode structure and a DC path from the first electrode structure to ground.

78. The accelerometer of claim 77, wherein the DC path is a transformer.

79. The accelerometer of claim 77, wherein the circuitry is configured to produce from the AC voltage a DC voltage proportional to the acceleration.

80. The accelerometer of claim 79, wherein the circuitry is configured to invert the DC voltage, apply the inverted DC voltage to the second electrode structure to return the electrode structures to an initial relative position, and isolate the DC voltage from the capacitive sensing device.

81. The accelerometer of claim 76, wherein the liquid is substantially nonelectrically conductive.

82. The accelerometer of claim 76, wherein the liquid provides damping of the relative movement of the electrode structures.

83. The accelerometer of claim 76, wherein the electrode structures have comb-like shapes with protruding plates that are asymmetrically interleaved with each other.

84. The accelerometer of claim 76, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

85. The accelerometer of claim 76, further comprising a flexible envelope in which the electrode structures and the liquid are disposed, wherein first and second leads coupled to the first and second electrode structures, respectively, protrude through the envelope, and the liquid contacts and is encased within the envelope.

86. An accelerometer comprising:
a capacitive sensing device that includes first and second electrode structures and a liquid, wherein a gap is disposed between the electrode structures, the liquid is disposed in the gap and contacts the electrode structures, the electrode structures move towards each other in response to a force applied to the capacitive sensing device, and the gap decreases in response to the applied force, thereby creating a displacement between the electrode structures in response to the applied force; and
circuitry coupled to the capacitive sensing device for determining from the displacement an electric signal indicative of acceleration of the applied force, wherein the circuitry is configured for active damping, provides an AC voltage to the first electrode structure, includes a blocking capacitor connected directly to the second electrode structure, an amplifier connected directly to the blocking capacitor, a diode connected directly to the amplifier, and an inverter connected directly to the diode and the second electrode structure, and the blocking capacitor, the amplifier, the diode and the inverter provide a closed-loop feedback path for the second electrode structure.

87. The accelerometer of claim 86, wherein the circuitry is configured to provide a DC path from the first electrode structure to ground.

88. The accelerometer of claim 87, wherein the DC path is a transformer.

89. The accelerometer of claim 87, wherein the circuitry is configured to provide an AC path from a node between the diode and the inverter to ground.

90. The accelerometer of claim 89, wherein the AC path is an RC filter.

91. The accelerometer of claim 86, wherein the liquid is substantially nonelectrically conductive.

92. The accelerometer of claim 86, wherein the liquid provides damping of the relative movement of the electrode structures.

93. The accelerometer of claim 86, wherein the electrode structures have comb-like shapes with protruding plates that are asymmetrically interleaved with each other.

94. The accelerometer of claim 86, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

95. The accelerometer of claim 86, further comprising a flexible envelope in which the electrode structures and the liquid are disposed, wherein first and second leads coupled to the first and second electrode structures, respectively, protrude through the envelope, and the liquid contacts and is encased within the envelope.

96. An accelerometer comprising:
a capacitive sensing device that includes first and second electrode structures, a liquid and a flexible envelope, wherein a gap is disposed between the electrode structures, the liquid is disposed in the gap and contacts the electrode structures, the electrode structures move towards each other in response to a force applied to the capacitive sensing device, the gap decreases in response to the applied force, thereby creating a displacement between the electrode structures in response to the applied force, the electrode structures and the liquid are disposed within the envelope, first and second leads coupled to the first and second electrode structures, respectively, protrude through the envelope, and the liquid contacts and is encased within the envelope; and
circuitry coupled to the capacitive sensing device for determining from the displacement an electric signal indicative of acceleration of the applied force.

97. The accelerometer of claim 96, wherein the circuitry is configured for passive damping.

98. The accelerometer of claim 97, wherein the circuitry is configured to provide an AC voltage across the electrode structures and measure a resulting AC current.

99. The accelerometer of claim 96, wherein the circuitry is configured for active damping.

100. The accelerometer of claim 99, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

101. The accelerometer of claim 96, wherein the liquid is substantially nonelectrically conductive.

102. The accelerometer of claim 96, wherein the liquid provides damping of the relative movement of the electrode structures.

103. The accelerometer of claim 96, wherein the electrode structures have comb-like shapes with protruding plates that are asymmetrically interleaved with each other.

104. The accelerometer of claim 96, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

105. The accelerometer of claim 96, wherein the envelope is a mylar film.

106. An accelerometer comprising:
   a capacitive sensing device that includes first and second electrode structures, a liquid and a thin film envelope, wherein a gap is disposed between the electrode structures, the liquid is disposed in the gap and contacts the electrode structures, the electrode structures move towards each other in response to a force applied to the capacitive sensing device, the gap decreases in response to the applied force, thereby creating a displacement between the electrode structures in response to the applied force, the electrode structures and the liquid are disposed within the envelope, first and second leads coupled to the first and second electrode structures, respectively, protrude through the envelope, and the liquid contacts and is encased within the envelope; and
   circuitry coupled to the capacitive sensing device for determining from the displacement an electric signal indicative of acceleration of the applied force.

107. The accelerometer of claim 106, wherein the circuitry is configured for passive damping.

108. The accelerometer of claim 107, wherein the circuitry is configured to provide an AC voltage across the electrode structures and measure a resulting AC current.

109. The accelerometer of claim 106, wherein the circuitry is configured for active damping.

110. The accelerometer of claim 109, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

111. The accelerometer of claim 106, wherein the liquid is substantially nonelectrically conductive.

112. The accelerometer of claim 106, wherein the liquid provides damping of the relative movement of the electrode structures.

113. The accelerometer of claim 106, wherein the electrode structures have comb-like shapes with protruding plates that are asymmetrically interleaved with each other.

114. The accelerometer of claim 106, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

115. The accelerometer of claim 106, wherein the envelope is a mylar film.

116. An accelerometer for use in a disk drive that includes an arm, a transducer and a storage medium, wherein the arm moves the transducer across the storage medium and the transducer exchanges data signals with the storage medium, the accelerometer comprising:
   a capacitive sensing device that includes first and second electrode structures and a liquid, wherein a gap is disposed between the electrode structures, the liquid is disposed in the gap and contacts the electrode structures, the electrode structures move towards each other in response to a force applied to the capacitive sensing device, the gap decreases in response to the applied force, thereby creating a displacement between the electrode structures in response to the applied force, and the capacitive sensing device is mounted between the arm and the transducer; and
   circuitry coupled to the capacitive sensing device for determining from the displacement an electric signal indicative of acceleration of the applied force.

117. The accelerometer of claim 116, wherein the circuitry is configured for passive damping.

118. The accelerometer of claim 117, wherein the circuitry is configured to provide an AC voltage across the electrode structures and measure a resulting AC current.

119. The accelerometer of claim 116, wherein the circuitry is configured for active damping.

120. The accelerometer of claim 119, wherein the circuitry is configured to provide an AC voltage across the electrode structures, produce therefrom a DC voltage proportional to the acceleration, invert the DC voltage, apply the inverted DC voltage to the second electrode structure to return the electrode structures to an initial relative position, and isolate the DC voltage from the capacitive sensing device.

121. The accelerometer of claim 116, wherein the liquid is substantially nonelectrically conductive.

122. The accelerometer of claim 116, wherein the liquid provides damping of the relative movement of the electrode structures.

123. The accelerometer of claim 116, wherein the electrode structures have comb-like shapes with protruding plates that are asymmetrically interleaved with each other.

124. The accelerometer of claim 116, wherein the electrode structures have comb-like shapes with protruding plates that are interleaved with each other and protrude along a first axis, and the electrode structures move towards each other primarily along a second axis perpendicular to the first axis such that corresponding plates move towards each other and non-corresponding plates move away from each other.

125. The accelerometer of claim 116, further comprising a flexible envelope in which the electrode structures and the liquid are disposed, wherein first and second leads coupled to the first and second electrode structures, respectively, protrude through the envelope, and the liquid contacts and is encased within the envelope.

* * * * *